No. 874,321. PATENTED DEC. 17, 1907.
J. GASCARD & R. SHIMMEN.
MACHINE FOR GRADING AND CLEANING POTATOES, ONIONS, AND OTHER PRODUCTS.
APPLICATION FILED AUG. 8, 1907.
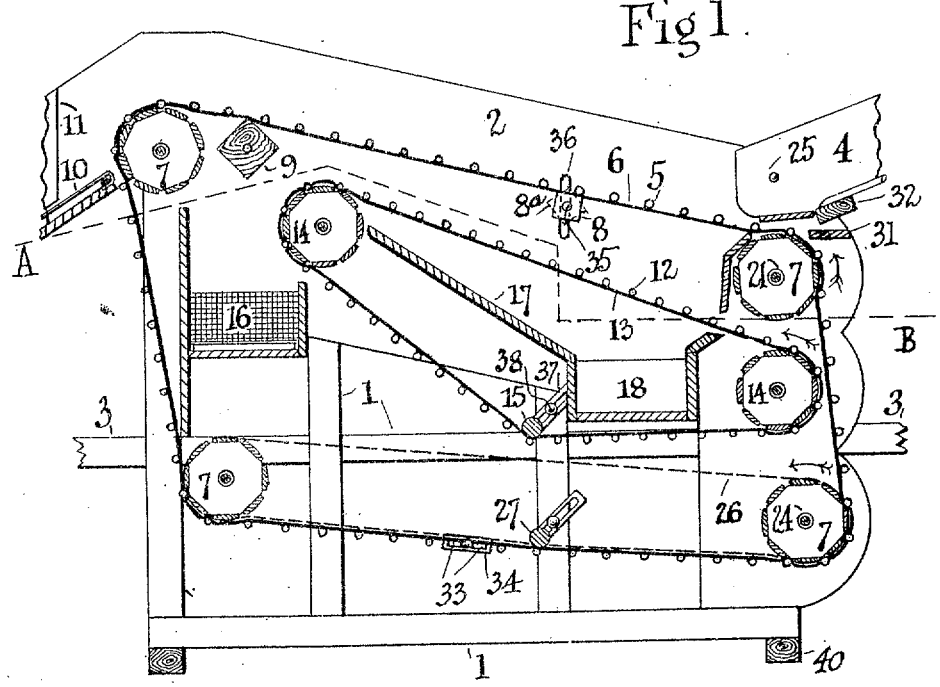
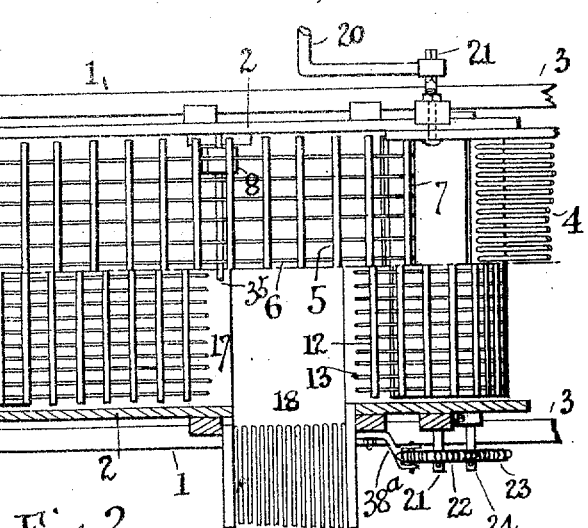

UNITED STATES PATENT OFFICE.

JULES GASCARD AND ROBERT SHIMMEN, OF BALLAN, VICTORIA, AUSTRALIA.

MACHINE FOR GRADING AND CLEANING POTATOES, ONIONS, AND OTHER PRODUCTS.

No. 874,321. Specification of Letters Patent. Patented Dec. 17, 1907.

Application filed August 8, 1907. Serial No. 387,698.

*To all whom it may concern:*

Be it known that we, JULES GASCARD, a subject of the King of Great Britain and Ireland, &c., residing at Ballan, in the State of Victoria, Commonwealth of Australia, and ROBERT SHIMMEN, a subject of the King of Great Britain and Ireland, &c., residing at Ballan, in the State of Victoria, Commonwealth of Australia aforesaid, have invented certain new and useful Improvements in Machines for Grading and Cleaning Potatoes, Onions, and other Products; and we do hereby declare the following to be a full, clear, and exact description of the invention, such as will enable others skilled in the art to which it appertains to make and use the same.

This invention relates to machines for grading potatoes, onions, fruit, and other produce or articles. It is rapid in action, can allow for any number of grades desired, and it avoids bruising the produce.

The machine is illustrated in the accompanying drawings, sundry details of which may however be obviously varied within the scope of our claims.

In these drawings Figure 1 is a side elevation showing parts of the machine with the near side casing removed. Fig. 2 is a plan view, one half being of the machine top; the other half showing the machine below section line A B of Fig. 1.

The machine illustrated is adapted to grade into large, medium, and small sizes, direct into bags.

In these drawings 1 is a frame having when desired any suitable handles 3, and having a hopper or box 4 for receiving the produce. This box is shown with a slatted bottom to allow of dirt falling through. It has its delivery or exit to an outer screen 5, 6. The size of the exit may be adjustable, but in the machine illustrated it is the width of the said screen.

The hopper is shown pivoted at 25 and is given any suitable inclination so that it may, when required, feed the screen by gravity.

31 shows a stop on which hopper base 32 may rest. This stop prevents the hopper sloping down outwardly.

The screen is made of transverse slats or ribs 5 (usually wooden) connected to longitudinal cords 6 (of any suitable material) which leave spaces or apertures of such size that all but the large grade produce can fall through.

The screen is made endless in any suitable way, being made as tight or loose as desired; thus 33 are belt end slats connected by lacing or by bands, 34 as close together as desired. The said screen passes round a plurality — usually four or more — of main rollers 7, the spindles of which are journaled suitably as in the frame sides 2. Usually there are also one or more rolls 8, 9, which may be adjustable, to regulate the screen contour, and may be removed if desired. These rolls may have any suitable irregular surface, and are shown of angular section, so that as they turn they vibrate the screen top. Roll 9 is shown square with a spindle which is driven from the spindle of a roller 7 as by means of pulleys 28, 29, and belt 30. 27 is a screen tension roller, made adjustable in any suitable way — see Fig. 1.

Screen 5, 6, has an up-grade from feed box 4 for any desired distance, as up to, or beyond roller 8 aforesaid. The grade may be allowed to change at rolls 8 and beyond it may be (for example) horizontal. It is shown upward all the way in Fig. 1; the position in which frame 1 of the machine is adjusted will affect the slope. If the slope in Fig. 1 is to be reduced the machine could be for example, raised at the foot 40, and could have adjustable legs or supports.

35 shows the spindle of rolls 8, 8$^a$, which may be blocks fixed at intervals along the spindle, there being for example one at each edge of the screen. The spindle 35 may be adjustable, as by having its ends in slots 36 in the frame sides 2, the friction of the screen on the blocks or rolls 8, 8$^a$ causing them to turn and vibrate the screen. We arrange in some cases, that the flat of one roll comes flat against the screen at the moment when the angle of another (8$^a$ Fig. 1) does so. This tilts some screen slats out of their horizontal position seen in end view in Fig. 1. Large potatoes are carried between side walls 2 by the screen slats 5, and are tipped over a roller 7, and fall upon a cushioning chute 10 (of canvas, or other textile, or resilient material); thence to any desired bagging means. Suitable hooks (not shown) are usually attached to the chute, and the bag tops are thus held in place. The produce may be fed to chute 10 fast enough to fill bags quickly; and we find it convenient to hinge or pivot as at 12, on the chute, a board 11, so that the produce can be diverted to either side of the chute, which can thus have two bags attached, so that when one is filled, board 11 can be at once swung over as per dotted lines (Fig. 2) and cause the other to be filled. Some dirt, and the produce of medium and small grade will drop through upper screen 5, 6, upon a second screen 12, 13, which is made endless and as loose as desired in any suitable way and is of any desired construction. This inner screen has smaller apertures than the other, and is passed over rollers 14, 15, so as to be located within the circuit of the outer screen. Roller 15 is shown adjustable its ends being rotatable in holes in a plate 37, which is slotted, and which when set in the desired position can be there fixed by a bolt 38 passing through the slot into the framing of the machine. Any of the rollers 7, or 14 may be made adjustable in position so as to regulate the screen which passes over it.

The inner screen (shown with slats 12 and cords 13) travels the medium sized potatoes or produce it receives on any suitable (as an upward) grade, and tips them over an end roller 14 upon a suitable cushion (as a canvas) chute 16 down which they pass to a receiver or bagging device. The chute may deliver to each side of the machine if desired, but is shown on the near side only.

The third grade potatoes or small produce, and some dirt, drop through screen 12, 13, upon a chute 17, which may be canvas, or otherwise cushioned, and is ordinarily not perforated. They then pass to an outwardly extending chute 18 which is shown perforated at its outer part which may be netting, or have slats 19. Through the apertures rubbish and dirt fall, while the third grade potatoes or goods pass over the said slats, or the like, to bagging or receiving means. All of the bagging chutes of this machine may have adjustable boards or guides as 11, if desired.

The slats 5, and 12, project above the cords so as to form comparatively high ridges, which act as carriers or conveyers to the potatoes or produce, even up a slope; the ridges and the motion of the screen, move and separate the potatoes or the like, so as to promote good grading. Some ridges are made higher than others in some machines, but as shown in the drawings all are alike. Additional vibrating devices for screen 12, 13 are added, in some cases, but the dropping thereon of the produce itself is usually sufficient. Thus we may add parts as 8, 8ª, 9.

The working of the two endless or continuous screens, is effected by turning a handle 20, or by power, thus revolving axle 21, and sprocket wheel 22 on the said axle—which projects from one of the rollers as 7. Sprocket 22 is connected by a chain to drive other sprocket wheels, one of which is on the axle of a roller 14 of the inner screen 12, 13. The chain is tightened if desired by any suitable device as a small wheel on a pivoted or adjustable arm 38ª Fig. 2. 24 is the spindle of a lower roller 7, and 23 is a sprocket wheel on that spindle over which the chain aforesaid passes. Thus both screens are rotated simultaneously. The direction of rotation need not necessarily be as in Fig. 1, where, however, it is shown by arrows.

It will be clear that any number of continuous screens may be used, each (except the outer one) inside some other. The rollers of the various screens have if desired, endless belts as 26 (shown in Fig. 1 only) immediately over them to reduce friction of the rollers on the screen cords, and to distribute strain between rollers so connected. To further reduce friction on the said cords there may be, across their under sides, any desired cross pieces,—not shown.

What we do claim as our invention and desire to secure by Letters Patent of the United States is:—

1. In a grading machine for vegetables, the combination of a hopper, an endless screen on to which said hopper delivers, a chute into which said screen delivers, a second endless screen, located entirely within the circuit of said first screen, a second chute into which said second screen delivers, and a third chute inside said second screen, provided with slats, substantially as described.

2. In a vegetable grading machine, the combination of a hopper, an endless screen into which said hopper delivers, a non circular roll to vibrate the upper portion of said screen, a chute into which said screen delivers, a second endless screen located entirely within the circuit of said first screen, a second chute into which said second screen delivers, and a third chute inside said second screen, provided with slats, substantially as described.

3. In a vegetable grading machine provided with a frame having slots, the combination of a hopper, an endless screen on to which said hopper delivers, a non circular roll having a spindle adjustable in said slots, said roll adapted to vibrate the upper portion of said screen, a chute into which said screen delivers, a second endless screen located entirely within the circuit of said first screen, a second chute into which said second screen delivers, and a third chute inside said second screen, provided with slats, substantially as described.

4. In a vegetable grading machine provided with a frame having slots, the combination of a hopper, an endless screen on to which said hopper delivers, a non circular roll having a spindle adjustable in said slots, a non-circular roll, said rolls adapted to vibrate the upper portion of said screen, a belt tightener for the lower portion of said screen, a chute into which said screen delivers, a second endless screen located entirely within the circuit of said first screen, a second chute into which said second screen delivers, and a third chute inside said second screen, provided with slats, substantially as described.

5. In a vegetable grading machine the combination of a frame having slots, a hopper, an endless screen on to which said hopper delivers, a non circular roll having a spindle adjustable in said slots, a second non circular roll, said rolls adapted to vibrate the upper portion of said screen, rollers around which said screen travels, a chute into which said screen delivers, a second endless screen located entirely within said first mentioned screen, a second chute into which said screen delivers, a third chute located entirely within the circuit of said second screen, a fourth chute into which said third chute delivers, and slats in said fourth chute, substantially as described.

6. In a vegetable grading machine the combination of a frame having slots, a hopper, an endless screen on to which said hopper delivers, a non circular roll having a spindle adjustable in said slots, a second non circular roll, said rolls adapted to vibrate the upper portion of said screen, rollers around which said screen travels, a chute into which said screen delivers, a second endless screen located entirely within said first mentioned screen, a second set of rollers around which said second screen travels, belt tighteners for each of said screens, a crank and connections for operating said screens, a second chute into which said screen delivers a third chute located entirely within the circuit of said second screen, a fourth chute into which said third chute delivers, and slats in said fourth chute, substantially as described.

In testimony whereof we affix our signatures in presence of two witnesses.

JULES GASCARD.
ROBERT SHIMMEN.

Witnesses:
GEORGE G. TURRI,
BEATRICE M. LOWE.